United States Patent
Roesner et al.

(10) Patent No.: US 10,773,600 B2
(45) Date of Patent: Sep. 15, 2020

(54) ELECTRICAL DRIVE UNIT FOR A VEHICLE

(71) Applicant: Bayerische Motoren Werke Aktiengesellschaft, Munich (DE)

(72) Inventors: Mathias Roesner, Munich (DE);
Thomas Bock, Oberhaching (DE);
Karl-Heinz Gaubatz, Parsdorf (DE);
Ralf Schmidt, Sauerlach (DE)

(73) Assignee: Bayerische Motoren Werker Aktiengesellschaft, Munich (DE)

( * ) Notice: Subject to any disclaimer, the term of this patent is extended or adjusted under 35 U.S.C. 154(b) by 452 days.

(21) Appl. No.: 15/293,313

(22) Filed: Oct. 14, 2016

(65) Prior Publication Data
US 2017/0028873 A1    Feb. 2, 2017

Related U.S. Application Data

(63) Continuation of application No. PCT/EP2015/059063, filed on Apr. 27, 2015.

(30) Foreign Application Priority Data

Apr. 28, 2014  (DE) .................. 10 2014 207 887

(51) Int. Cl.
*H02K 7/116*   (2006.01)
*H02K 9/22*    (2006.01)
(Continued)

(52) U.S. Cl.
CPC ............ *B60L 15/2054* (2013.01); *B60K 1/02* (2013.01); *H02K 7/003* (2013.01); *H02K 7/108* (2013.01);
(Continued)

(58) Field of Classification Search
CPC . B60K 6/38; B60K 1/02; H02K 7/003; H02K 7/116
(Continued)

(56) References Cited

U.S. PATENT DOCUMENTS 2,356,590 A  *  8/1944  Jacobsen ................. 236/1 D
4,685,354 A     8/1987  McCabria
(Continued)

FOREIGN PATENT DOCUMENTS

CN     1689854 A     11/2005
DE    1 953 146      4/1971
(Continued)

OTHER PUBLICATIONS

Machine Translation, Takano, JP-04143123-A, May 1992. (Year: 1992).*

(Continued)

*Primary Examiner* — Thomas Truong
(74) *Attorney, Agent, or Firm* — Crowell & Moring LLP

(57) ABSTRACT

An electrical drive unit for a vehicle includes a number of structurally independently designed electrical machines. In each of the electrical machines there is a machine output shaft configured to provide a machine torque, and in each of the electrical machines there is inserted in a receiving region assigned to it and is connected to the receiving unit. The number of the inserted electrical machines is predetermined as a function of a specified value, which is prespecified in advance for an output-side characteristic quantity of the drive unit to be constructed. The number of the inserted electrical machines is between 1 and a maximum number. The electrical drive unit also includes a common main shaft, via which the drive unit is configured to provide a drive unit torque on the output side, and a coupling element, via which the machine output shafts are operationally connected on the driving side to the main shaft to input the machine torques.

15 Claims, 6 Drawing Sheets

(51) Int. Cl.
  *B60L 15/20* (2006.01)
  *B60K 1/02* (2006.01)
  *H02K 7/00* (2006.01)
  *H02K 7/108* (2006.01)
  *H02K 5/18* (2006.01)

(52) U.S. Cl.
  CPC ............... *H02K 7/116* (2013.01); *H02K 9/22* (2013.01); *B60L 2200/12* (2013.01); *B60L 2220/50* (2013.01); *B60L 2240/423* (2013.01); *B62K 2204/00* (2013.01); *H02K 5/18* (2013.01); *Y02T 10/641* (2013.01); *Y02T 10/645* (2013.01); *Y02T 10/72* (2013.01); *Y02T 10/7275* (2013.01)

(58) Field of Classification Search
  USPC .................. 310/112, 114, 75 R, 76, 78, 3, 99
  See application file for complete search history.

(56) References Cited

U.S. PATENT DOCUMENTS

| | | | | |
|---|---|---|---|---|
| 5,838,085 | A * | 11/1998 | Roesel, Jr. ............. | F02N 11/04 310/113 |
| 2002/0033059 | A1* | 3/2002 | Pels ......................... | B60K 6/26 74/329 |
| 2006/0087123 | A1* | 4/2006 | Stout ....................... | F02C 7/268 290/2 |
| 2008/0318724 | A1* | 12/2008 | Lott ........................ | F16H 61/32 475/149 |
| 2014/0353062 | A1 | 12/2014 | Bock et al. | |
| 2015/0318812 | A1* | 11/2015 | O'Donnell ............ | F16H 37/065 318/498 |

FOREIGN PATENT DOCUMENTS

| | | | |
|---|---|---|---|
| DE | 36 19 368 A1 | 1/1987 | |
| DE | 44 02 337 A1 | 8/1995 | |
| DE | 197 39 906 A1 | 3/1999 | |
| DE | 10 2005 061 006 A1 | 6/2007 | |
| DE | 10 2011 056 012 A1 | 6/2013 | |
| DE | 10 2012 202 432 A1 | 8/2013 | |
| EP | 0 913 600 A1 | 5/1999 | |
| EP | 1 319 866 A1 | 6/2003 | |
| EP | 2 116 412 A2 | 11/2009 | |
| EP | 2 572 917 A1 | 3/2013 | |
| FR | 2 911 539 A1 | 7/2008 | |
| JP | 4-143123 A | 5/1992 | |
| JP | 04143123 A * | 5/1992 | .......... B60L 11/1805 |
| JP | 2011-240772 A | 12/2011 | |

OTHER PUBLICATIONS

International Search Report (PCT/ISA/220 & PCT/ISA/210) issued in PCT Application No. PCT/EP2015/059063 dated Aug. 7, 2015 with English translation (Six (6) pages).

German-language Written Opinion (PCT/ISA/237) issued in PCT Application No. PCT/EP2015/059063 dated Aug. 7, 2015 (Five (5) pages).

German-language Search Report issued in counterpart German Application No. 10 2014 207 887.3 dated Nov. 26, 2014 with partial English translation (Thirteen (13) pages).

Chinese-language Office Action issued in counterpart Chinese Application No. 201580004665.2 dated Nov. 1, 2017 with English translation (Fifteen (15) pages).

Japanese-language Office Action issued in counterpart Japanese Application No. 2016-562029 dated Feb. 27, 2019 with partial English translation (nine (9) pages).

* cited by examiner

ELECTRICAL DRIVE UNIT FOR A VEHICLE

CROSS REFERENCE TO RELATED APPLICATIONS

This application is a continuation of PCT International Application No. PCT/EP2015/059063, filed Apr. 27, 2015, which claims priority under 35 U.S.C. § 119 from German Patent Application No. 10 2014 207 887.3, filed Apr. 28, 2014, the entire disclosures of which are herein expressly incorporated by reference.

BACKGROUND AND SUMMARY OF THE INVENTION

The electrical drive unit disclosed here is to be employable for any vehicles, i.e. for vehicles on land, in the water and in the air, preferably however it is to be employed with land vehicles. Accordingly, the following explanations mainly relate to land vehicles. However, this is not supposed to have any restrictive effect. Correspondingly, these explanations are transferable for example also to watercraft.

Electrical drive units can be employed both in a hybrid vehicle as well as in an electric vehicle. Hybrid or electric vehicles comprise at least one electrical machine as drive machine, wherein the same is supplied with electric energy from a traction battery. In the case of a hybrid vehicle, a further unit for the drive is employed in addition to the at least one electrical machine, generally an internal combustion engine. Whereas an electric vehicle is exclusively driven by at least one electrical machine. The electrical machines that are employed are generally designed as internal rotor machines, in the case of which a rotatably mounted rotor is enclosed by a stationary stator. As drive machines, synchronous machines, in particular hybrid-synchronous machines can be employed for example.

The following explanations relate to electric vehicles, but this is not supposed to have any restrictive effect. Correspondingly, these explanations can also be transferred to hybrid vehicles.

Generally, an individual electrical machine and a transmission or transmission system that is designed to suit the requirements are employed for driving an electric vehicle. In order to achieve a demanded or necessary overall drive transmission ratio, various transmission stages can be employed, for example a countershaft transmission, a manual shift transmission, secondary drives, continuously variable transmissions (so-called CVT transmissions), range gears, axle drive gears, etc. The aforementioned transmissions can be designed to be shiftable either manually or in an automated manner. Design versions are also employed, in the case of which the electrical machine for a special drive solution is directly connected to the transmission via a coaxial input shaft. Furthermore, a power transmission from the electrical machine to the transmission can be effected by way of a belt, a chain drive or via spur gears.

For achieving higher output torques or output performances, it can be provided to couple multiple electrical machines to one another and introduce the power provided by the electrical machines in each case or the torque provided in each case into a common transmission. This coupling can be effected by means of belt or chain drives. Such a coupling however has the following disadvantages: on the one hand, it requires a lot of installation space. For this reason, electrical drive units with already two (or even more) electrical machines can only be installed in motorcycles or scooters with difficulty or not at all, since in the case of these two vehicle types only a limited installation space is available. Even in the case of primarily smaller passenger cars or even in the case of outboard motors employed in watercraft, the abovementioned installation space problem can occur. On the other hand, this type of coupling is not optimal with a view to the efficiency. Because of the numerous elements involved in the power transmission, altogether elevated friction losses and thus elevated heat inputs in the drive system or in the drive unit occur.

Even modular kit approaches that have become known to date, with which it is possible to variably equip a vehicle, i.e. corresponding to the respective requirements, with a drive or motor of variable output, in that for this purpose identical electrical machines are coupled to one another (key word "swarm motorization" or "quantity scaling"), are not yet optimal. The reason is that with these approaches a suitable, i.e. individually adapted coupling transmission with associated housing has to be developed or applied for each vehicle to be applied.

It is therefore an object of the embodiments of the present invention to provide a compact electrical drive unit for a vehicle that is constructed simply and cost-effectively, but which nevertheless works reliably and which can be easily adapted to the various torque or output requirements of different vehicles or vehicle classes at the same time and which is additionally characterized by very low efficiency losses.

This and other objects are solved through an electrical drive unit for a vehicle having a receiving unit, wherein the receiving unit comprises a maximum number of receiving regions, of which each is designed in order to receive an electrical machine, a number of structurally independently designed electrical machines, wherein each of these electrical machines comprises a machine output shaft for providing a machine torque, and wherein each of these electrical machines is inserted in a receiving region assigned to it and is connected to the receiving unit, wherein the number of the inserted electrical machines is predetermined, namely as a function of a specified value, which is prespecified in advance for an output-side characteristic quantity of the drive unit to be constructed, wherein the number of the inserted electrical machines lies between 1 and the maximum number, a common main shaft, via which the drive unit a drive unit torque on the output side, and a coupling element, via which the machine output shafts are operationally connected on the driving side to the main shaft for inputting the machine torques.

The disclosed electrical drive unit is based on the idea that the drive unit according to the invention comprises a receiving unit, into which a number of structurally independently designed electrical machines can be inserted. The number of the electrical machines to be inserted or then ultimately inserted in the receiving unit is predetermined for the respective electrical drive unit to be constructed, namely as a function of a specified value, which is prespecified in advance, i.e. at the project stage, for an output-side characteristic quantity of the drive unit to be constructed for a concrete vehicle or for a concrete vehicle class. This number can lie between 1, the electrical drive unit in this case provides the lowest drive unit torque, and a maximum number predetermined by way of the configuration of the receiving unit, in this case the electrical drive unit provides the highest drive unit torque. The disclosed drive unit comprises a main shaft and a coupling element, via which the machine output shafts of the individual electrical machines are operationally connected to the main shaft for inputting the machine torque which is provided in each case by the electrical machines. By way of the main shaft, the drive unit provides a drive unit torque on the output side, which emanates through superimposition of the machine torques provided by the individual electrical machines in each case. In the case of the disclosed drive unit, the machine torques that are provided by the individual electrical machines are superimposed on the input side.

With the disclosed electrical drive unit it is thus possible to provide in a simple manner a drive unit for a certain vehicle or for a certain vehicle class which is adapted to the torque or power requirements of the respective vehicle or the respective vehicle class. This simple adaptation is achieved in that a number of electrical machines between 1 and the maximum number can be inserted in the receiving unit. This means that a number of electrical machines can be inserted which is based on or predetermined by the torque or the output which the electrical drive unit ultimately has to provide as a maximum on the output side. In other words, the disclosed drive unit is a scalable drive unit in the case of which the maximum torque that can be provided on the output side or the maximum power that can be provided on the output side can be set up in steps, these steps being predetermined by the individual electrical machines used.

Because of the fact that the machine torques are input onto the main shaft via a common coupling element, a compact, simple and additionally reliably operating construction of the electrical drive unit is achieved. Because of the low number of individual components involved in the input, very low efficiency losses are additionally incurred. This type of input is additionally characterized in that the pairing formed of the machine output shaft and the coupling element merely has to be designed with respect to the machine torque that is provided by the individual electrical machines. Merely the main shaft has to be designed in its size and mounting with respect to the in particular maximum possible drive unit torque resulting from the superimposition of the individual machine torques, which is provided by the drive unit on the output side via the main shaft. This contributes to the cost-effective construction of the disclosed drive unit.

The abovementioned objects are therefore solved completely by the disclosed drive unit.

Electrical machines of identical design may be used, i.e. it is provided to introduce into the receiving unit a number of identically designed electrical machines. By providing an electrical standard machine, a particularly cost-effective electrical drive unit can be constructed since the drive unit in this case consists of a great many identical parts which accordingly are cost-effective in the procurement. The use of a so-called standard machine furthermore has the advantage that the drive unit torque provided by the drive unit on the output side can be predetermined in predetermined steps, wherein the step is predetermined by the machine torque (rated torque) of the standard machine. In other words: the drive unit torque can be stepped corresponding to the machine torque of the standard machine. Corresponding to the maximum drive unit torque to be provided by the drive unit, a number of standard machines derived from this are inserted in the drive unit.

Further, the receiving unit may be designed in such a manner that the inserted electrical machines are arranged in such a manner that the machine output shafts are oriented parallel to one another. Through this measure, an electrical drive unit that is constructed in a particularly compact manner can be realized.

Additionally, the receiving unit may be designed in such a manner that the inserted electrical machines are arranged in such a manner that the machine output shafts are arranged symmetrically with respect to the main shaft. This measure makes possible on the one hand particularly favorable introducing or inputting of the machine torques onto the main shaft and on the other hand an exceedingly compact construction of the drive unit.

Moreover, the receiving unit may be designed in such a manner that the inserted electrical machines are arranged in such a manner that the machine output shafts are oriented parallel to the main shaft. This measure also makes possible a particularly compact construction of the electrical drive unit.

The electrical machines may be arranged symmetrically to a center axis, wherein this center axis corresponds to the axis of rotation of the main shaft. Particularly, the electrical machines may be arranged so that the individual machine output shafts are located on a circularly formed line, wherein the main shaft runs through the center point of this line and the machine output shafts in the process are oriented parallel to the main shaft. In other words, the electrical machines may be arranged in such a manner that the machine output shafts which are oriented parallel to the main shaft are arranged concentrically to the main shaft. An electrical drive unit with electrical machines arranged in such a manner has a minimal installation space. The vehicle in which a drive unit designed in such a manner is employed may be a single-track vehicle, i.e. for example a motorcycle or a scooter. As already explained at the outset, the installation space that is available with both these vehicle types is greatly limited, which is why an electrical drive unit has to be constructed in a particularly compact manner. Alternatively, an electrical drive unit designed in such a manner can also be employed with smaller passenger cars or even with outboard motors for watercraft.

Further, the coupling element may be a gear wheel which is operationally connected to the main shaft. Consequently, the machine output shafts in the case of a coupling element designed in this manner comprise at least one gear wheel region, via which they are operationally connected in each case to the gear wheel. The gear wheel region can be a structurally independently embodied gear wheel that is attached, i.e. connected to the machine output shaft. However it is also conceivable that the gear wheel region is worked into the machine output shaft by means of machining. A coupling element that is designed as gear wheel is cost-effective in its production on the one hand and together with suitably designed machine output shafts makes possible, on the other hand, particularly reliable inputting of the machine torques into the main shaft and thus the construction of a reliably operating drive unit. The individual inserted electrical machines thus drive a gear wheel mounted on the main shaft by way of their respective machine output shaft. The gear wheel pairing provided with this configuration merely has to be designed with a view of the machine torque to be input in the main shaft by the respective electrical machine.

When, as explained further above, the electrical machines are arranged in such a symmetrical manner with respect to a center axis that this center axis corresponds to the axis of rotation of the main shaft and the individual machine output shafts are located on a circularly formed line, through the center point of which the main shaft runs and the machine output shafts in the process are oriented parallel to the main shaft, the entire arrangement, which consists of the coupling element designed as gear wheel and the respective machine output shafts comprising a gear wheel region, correspond to that of a planetary gear set which however does not comprise an internal gear wheel. With respect to the spatial arrangement, the gear wheel regions correspond to the planets and the coupling element that is designed as gear wheel to the common sun gear. The gear wheel pairing realized in this manner corresponds to a transmission stage of a transmission. The machine output shafts are arranged concentrically to the main shaft.

As already explained above, the maximum drive unit torque that can be provided by the drive unit is determined by the number of the electrical machines inserted in the receiving unit, wherein the same is capped to that value which is obtained when the maximum number of electrical machines is inserted in the receiving unit. Accordingly it is possible to design those components, of which the transmission described above is constructed, and thus the transmission to the specific drive unit torque which materializes in the case of the maximum number of inserted electrical machines. Thus, a uniformly dimensioned transmission can be used for the different vehicles or vehicle classes, in which the disclosed electrical drive unit is to be employed. In addition to the use of electrical machines of identical design, this also leads to an increased use of identical parts, which likewise contributes to a cost-effective construction of the disclosed drive unit.

Advantageously, the coupling element is operationally connected to the main shaft via a freewheeling device. This is the case when the main shaft is part of a transmission of multi-stage design. Particularly, this should be a two-stage transmission design. The freewheeling device, in the simplest case, can be a mechanically realized overrunning clutch, which is realized for example in the form of a clamping roller overrunning clutch or a clamping body overrunning clutch. With this configuration, the first transmission stage is overrun with increasing rotational speed of the main shaft from a certain, i.e. predetermined rotational speed. However, it can also be an activated actuator which is advantageous in particular when for the electrical drive unit a so-called recuperation operation should likewise be possible. The actuator can be embodied in the form of a clutch, by way of which the first transmission stage can be decoupled from the main shaft at a correspondingly high rotational speed of the main shaft. This means that the clutch is designed so that from a certain rotational speed of the main shaft the frictional connection between the coupling element and the main shaft is cancelled. Activating the actuator in this case can take place electrically or hydraulically.

For forming a first stage of such a transmission, the gear wheel regions of the machine output shafts and the coupling element designed as gear wheel should interact. For forming a further, in particular second stage of the transmission, the machine output shafts each comprise a further gear wheel region, wherein the further gear wheel regions interact with a further gear wheel that is operationally connected to the main shaft. This design chosen for the transmission has the advantage that a transmission of compact construction with a very large number n of transmission stages can be realized in a simple manner, which can be preferentially designed to be shiftable, for example as a function of the rotational speed of the main shaft.

The multi-stage construction of the transmission can be realized as follows: in the case of an n-stage transmission, the machine output shafts comprise n gear wheel regions that are arranged one behind the other, which each have a different number of teeth. The gear wheel regions that are arranged one behind the other can be realized for example in that on the machine output shafts n gear wheels (levels 1 to n) each are arranged. These gear wheels are each operationally connected to or engaged with n gear wheels (likewise levels 1 to n) correspondingly arranged on the main shaft, the so-called sun gears. By way of a rotational speed-control of the frictional connection between the individual gear wheels arranged on the main shaft and the main shaft, the shifting of the transmission into different gears can take place. In order to be able to realize different transmission ratios for the individual pairings, consisting of the gear wheel regions which are assigned to one another in each case on the one hand and the sun gear on the other hand, the pairings have to have different number of teeth ratios among them, i.e. for example the pairing of the level 1 has a number of teeth ratio $z_1$ and the pairing of the level n–2 has a number of teeth ratio $z_{n-2}$, wherein $z_1$ and $z_1$ and $z_{n-2}$ differ, wherein this consideration shall apply to all conceivable pairing combinations by pairs.

In order to be able to realize a transmission that is embodied or shiftable in multiple stages, it is provided advantageously, that the further gear wheel is operationally connected to the main shaft via a clutch device. Advantageously, the clutch device is designed for this purpose in order to make possible a frictional connection between the further gear wheel and the main shaft. Thus it is possible in the presence of a predetermined criterion, for example on reaching a predefined rotational speed of the main shaft, to bring the further gear wheel in engagement with the main shaft, which results in that a different gear stage is selected. The clutch device can be a purely mechanically operating clutch, in the case of which the required frictional connection is established in that moveable elements are moved or shifted based on a centrifugal force that materializes. For example, a centrifugal clutch is mentioned here. However, it can also be actuators which are constructed electromagnetically or hydraulically, which are activated by way of suitable activation signals for forming the frictional connection. The use of such activatable clutch devices is opportune for example when it is intended to operate a vehicle, which is equipped with the disclosed drive unit, also in recuperation mode.

Alternatively, the clutch device can also be embodied manually actuatable.

Additionally, the receiving unit may comprise cooling fins. This measure has the advantage that a reliable cooling of the electrical drive unit is possible in a simple manner. Elaborate water cooling can be omitted. This measure makes possible the cost-effective construction of a reliably operating drive unit. Alternatively or complementarily, further components of the drive unit can likewise be provided with cooling fins.

Because of its highly compact construction, the disclosed drive unit is particularly well suited for use in motorcycles or scooters. The structural union of the electrical machines on the one hand and of the transmission on the other hand given with the disclosed drive unit to form a compact drive unit makes possible in the case of a scooter a drive train swing arm-fixed mounting, whereas in the case of a motorcycle, mounting fixed to the frame takes place. The arrangement of the disclosed drive unit, as drive train-fixed (scooter) or as frame-fixed component (motorcycle), brings about an improved heat household for the disclosed drive unit.

Further, the inserted electrical machines may each comprise an individually assigned activation device. This measure makes possible uniform inputting of the machine torques provided by the individual electrical machines since it is possible for example to offset component-specific tolerances. In this connection it can be provided that one of these activation devices is assigned the function of the master while the remaining activation devices each hold the function of a slave. Alternatively it can be provided that the function of the master is not assumed by one of the activation devices itself but that a superordinate central control unit is provided for this purpose.

As already mentioned above, the drive unit provides a drive unit torque on the output side via the main shaft, which materializes through superimposition of the machine torques which in each case are provided by the individual electrical machines. Insofar, the disclosed drive unit can be considered as a drive unit which has a transmission, which has the functionality of a "summation transmission".

Other objects, advantages and novel features of the embodiments of the present invention will become apparent from the following detailed description of one or more embodiments when considered in conjunction with the accompanying drawings, in which:

DETAILED DESCRIPTION OF THE DRAWINGS

Figure 1:
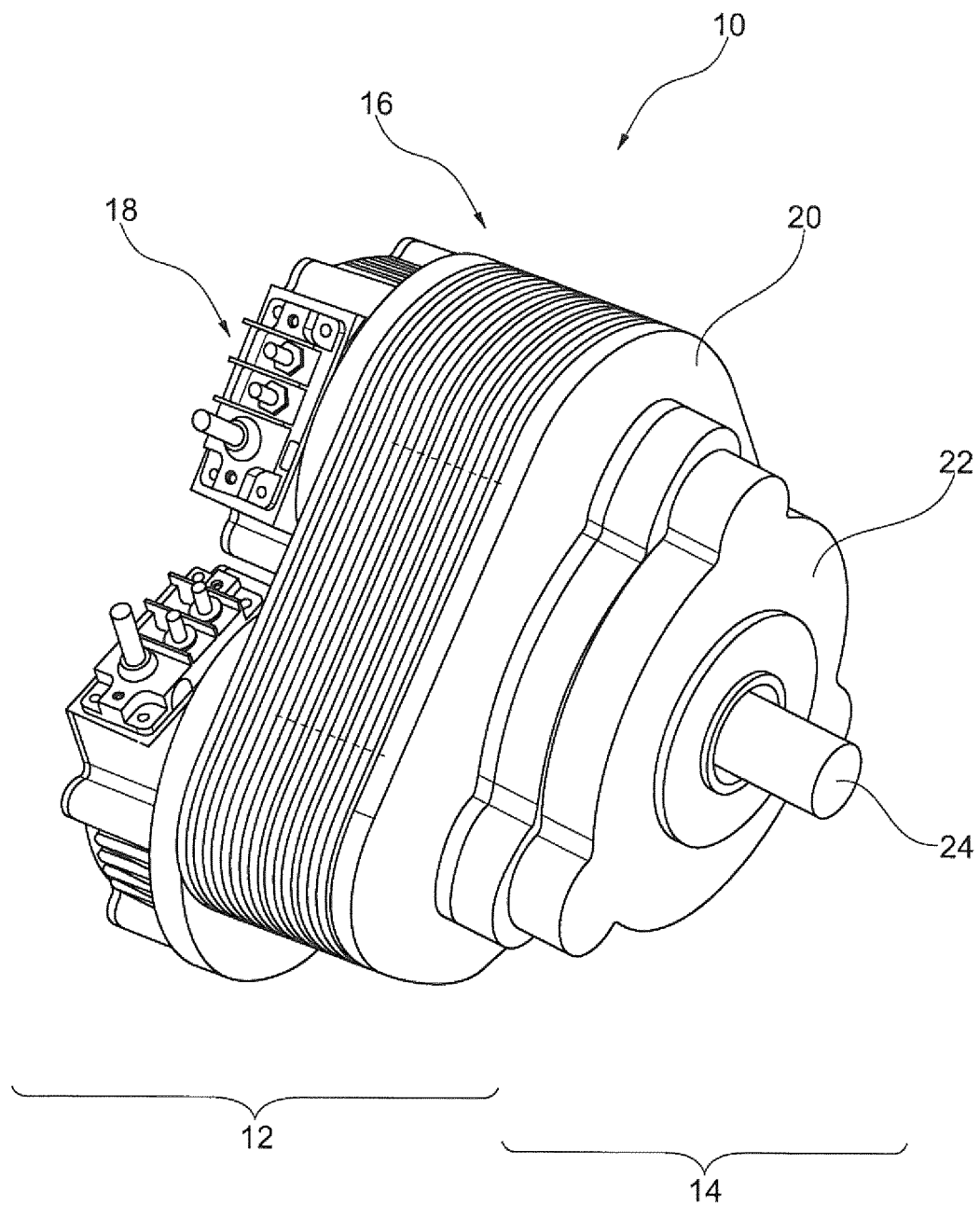
FIG. 1 is a schematic representation of the electrical drive unit.

FIG. 1 shows an electrical drive unit 10. The drive unit 10 is divided into a machine-sided part 12 and a transmission-sided part 14. The motor-sided part 12 comprises a receiving unit 16, into which a number of electrical machines is inserted, of which one is marked with the reference number 18. The motor-sided part 12 is closed off with a motor part cover 20. The transmission-sided part 14 sits on the motor part cover 20. The transmission-sided part 14 is closed off with a transmission part cover 22. The transmission-sided part 14 comprises a main shaft 24 which part-circumferentially protrudes from the same, via which the electrical drive unit 10 can provide a drive unit torque on the output side. The drive unit torque is transmitted via a transmission device which is not shown in FIG. 1 to drive wheels of a vehicle which is likewise not shown. If the vehicle is for example a scooter or a motorcycle, the transmission device can be a chain or a belt.

In a further schematic representation, FIG. 2 again shows the drive unit 10, wherein compared with FIG. 1 the electrical machines installed in the drive unit 10 are shown separately. One of these electrical machines is exemplarily marked with the reference number 18.

Figure 2:
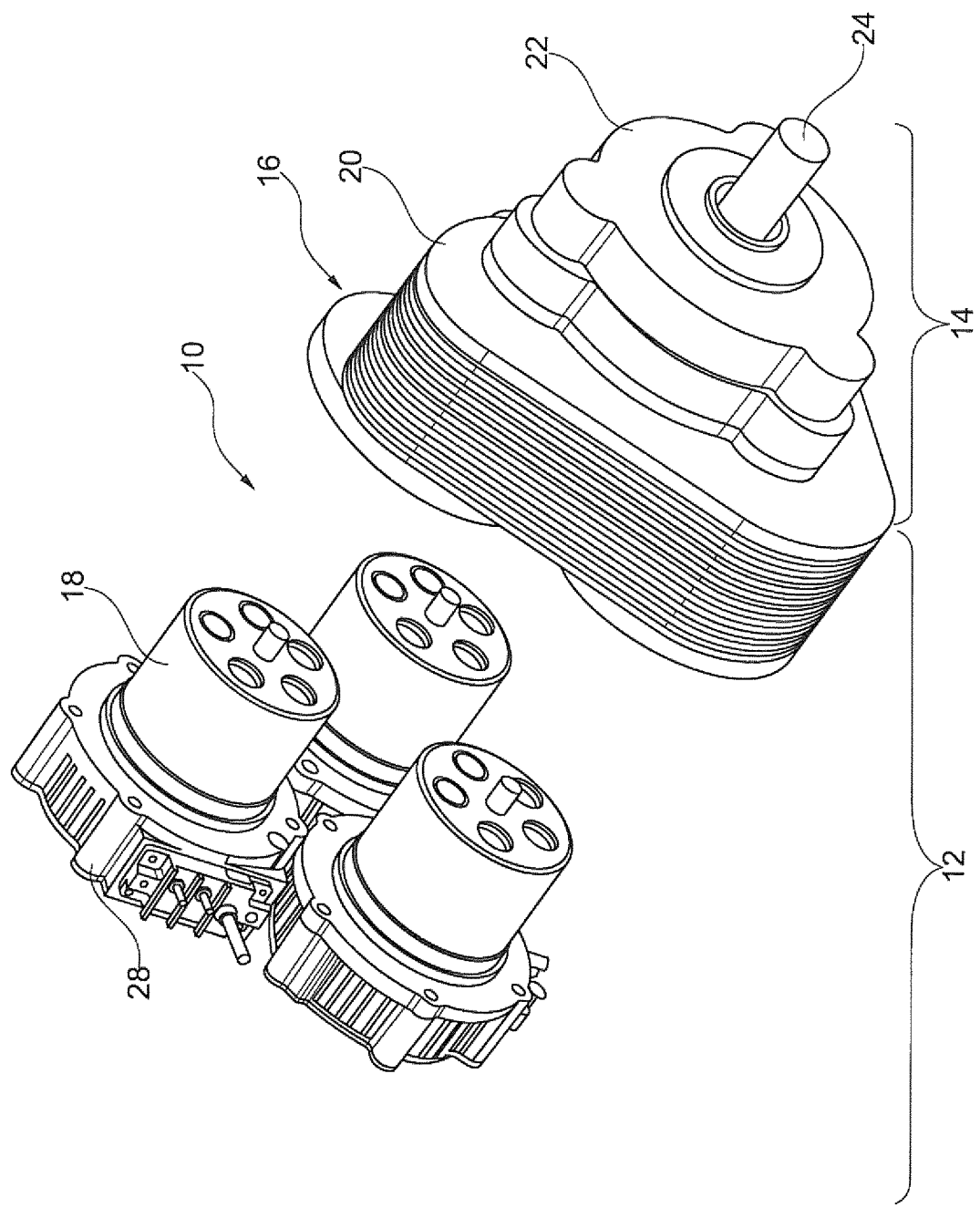
FIG. 2 is a schematic representation of the drive unit, in which the electrical machines that are installed in the drive unit are shown separately.

As is evident in the representation in FIG. 2, the receiving unit 16 is designed in order to receive a number of electrical machines 18 which are structurally designed independently. To this end, the receiving unit 16 comprises a maximum number of receiving regions 26 still to be described in connection with FIG. 4, wherein each of these receiving regions 26 is designed in order to receive one of the electrical machines 18.

The drive unit shown in the figures is designed in order to maximally receive three electrical machines. This is not supposed to have a restrictive effect. Obviously, the drive unit can also be designed in order to receive any other maximum number of electrical machines, subject to suitable adaptation of the machine-sided part 12 and of the transmission-sided part 14.

As is evident in the representation in FIG. 2, the electrical machines 18 to be inserted or then inserted in the receiving unit 16 each have an individually assigned activation device 28, with which the respective electrical machine 18 for its operation can be activated. According to the representation in FIG. 2, an activation device 28 and an electrical machine 18 are to form a structural unit in each case. This is not supposed to have a restrictive effect. It is also conceivable that the activation device 28 and the electrical machine 18 are arranged spatially separated from one another. Furthermore it is also conceivable to provide a single activation device with which all electrical machines installed in the drive unit are equally activated.

Figure 3:
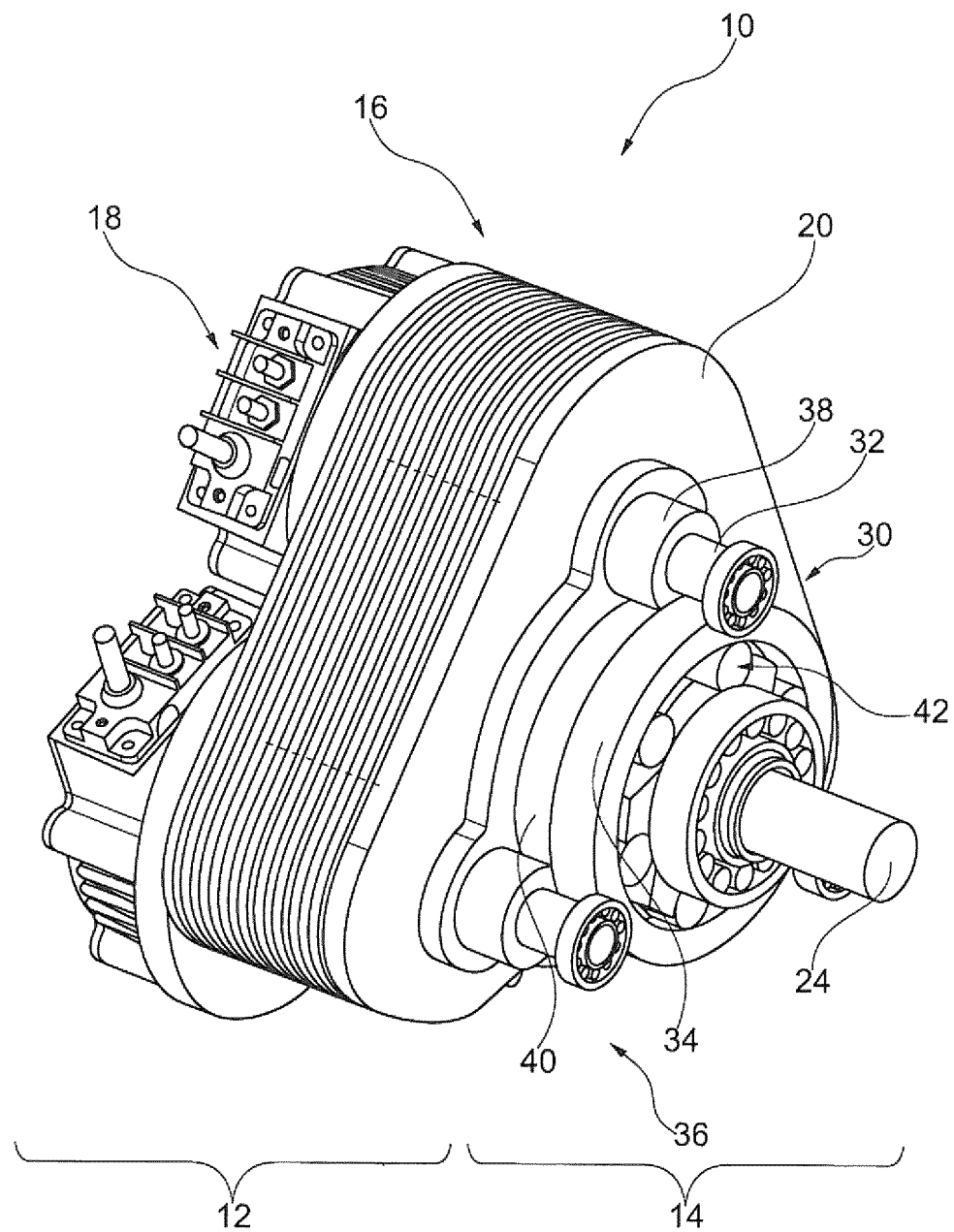
FIG. 3 is schematic representation of the construction of the transmission-sided part, in the case where the transmission part cover is removed.

FIG. 3 shows the drive unit 10 without the transmission part cover 22.

As is evident from the representation in FIG. 3, each of the electrical machines 18 comprises a machine output shaft for providing a machine torque, wherein one of these machine output shafts is exemplarily marked with the reference number 30. The machine output shafts 30 comprise a gear wheel region 32, via which the respective machine output shaft 30 is operationally connected to a coupling element 34 designed as gear wheel. By way of the coupling element 34, the machine output shaft 30 is operationally connected on the drive side to the main shaft 24 for inputting a machine torque.

The transmission-sided part 14 is to comprise a transmission 36 designed in two stages, wherein for forming a first stage of the two-stage transmission 36 the gear wheel regions 32 of the machine output shafts 30 and the coupling element 34 designed as gear wheel interact. For forming a further, namely the second stage of the transmission 36, the machine output shafts 30 each comprise a further gear wheel region 38. The further gear wheel regions 38 interact with a further gear wheel 40 which is operationally connected to the main shaft 24.

In order for the two-stage transmission 36 to be shiftable, the coupling element 34 is not directly operationally connected with the main shaft 24 but via a freewheeling device 42. Furthermore, the further gear wheel 40 is operationally connected to the main shaft 24 via a clutch device 44 that is not visible in FIG. 3. The clutch device 44 is designed in order to make possible a frictional connection between the further gear wheel 40 and the main shaft 24.

The mode of operation of the two-stage transmission 36 in this case is as follows: in the first stage, the electrical machines 18 drive the main shaft 24 by way of the coupling element 34 arranged on the freewheeling device 42, wherein in this case the freewheeling device 42 is in its blocking or blocked condition. From a certain rotational speed of the main shaft 24, the clutch device 44, which is designed as mechanically operating centrifugal clutch, comes into engagement. By way of this clutch device 44, the further gear wheel 40 is mounted on the main shaft 24. Because of the fact that the clutch device 44 of the second stage comes into engagement, the freewheeling device 42 of the first stage is overrun. Inputting the machine torques thus no longer takes place by way of the first stage (pairing gear wheel region 32, coupling element 34) of the transmission, but by way of the second stage (pairing further gear wheel region 38, further gear wheel 40). The transmission is thus a two-stage transmission that shifts in an automated manner namely as a function of the rotational speed or the centrifugal force.

Both the coupling element 34 designed as gear wheel and also the further gear wheel 40, because of their arrangement with respect to the gear wheel regions 32 and the further gear wheel regions 38 respectively, can be considered as sun gear.

The representation in FIG. 3, according to which it concerns a transmission of two-stage design, is not supposed to have a restrictive effect. Formulated in a general manner, the drive unit can comprise a multi-stage transmission with n stages. If it concerns a transmission with more than the two stages shown in FIG. 3, the machine output shafts accordingly comprise more further gear wheel regions and on the main shaft 24 correspondingly more further gear wheels by way of associated clutch devices are arranged, wherein both the further gear wheel regions and also the further gear wheels are each arranged one behind the other. The clutch devices in this case are either designed so that they make possible due to inertia at different rotational speeds of the main shaft 24 a frictional connection between the respective further gear wheel and the main shaft 24, or are activated by way of a suitably equipped activation unit, that by way of the transmission stages formed of the respective associated further gear wheel regions and further gear wheels at different rotational speeds the inputting of the machine torques into the main shaft 24 takes place.

As is evident from the representation in FIG. 3, the receiving unit 16 is designed in such a manner that the inserted electrical machines 18 are arranged in such a manner that the machine output shafts 30 are oriented parallel to one another. In addition, the inserted electrical machines 18 are arranged in such a manner that the machine output shafts 30 are arranged symmetrically with respect to the main shaft 24. Here, the machine output shafts 30 are oriented parallel to the main shaft 24. The electrical machines are arranged symmetrically to a center axis, wherein this center axis corresponds to the axis of rotation of the main shaft. The individual machine output shafts in this case are located on a line which is substantially formed circularly, through the center point of which the main shaft runs. This means that the electrical machines are arranged in such a manner that the machine output shafts which are oriented parallel to the main shaft are arranged concentrically to the main shaft.

Figure 4:
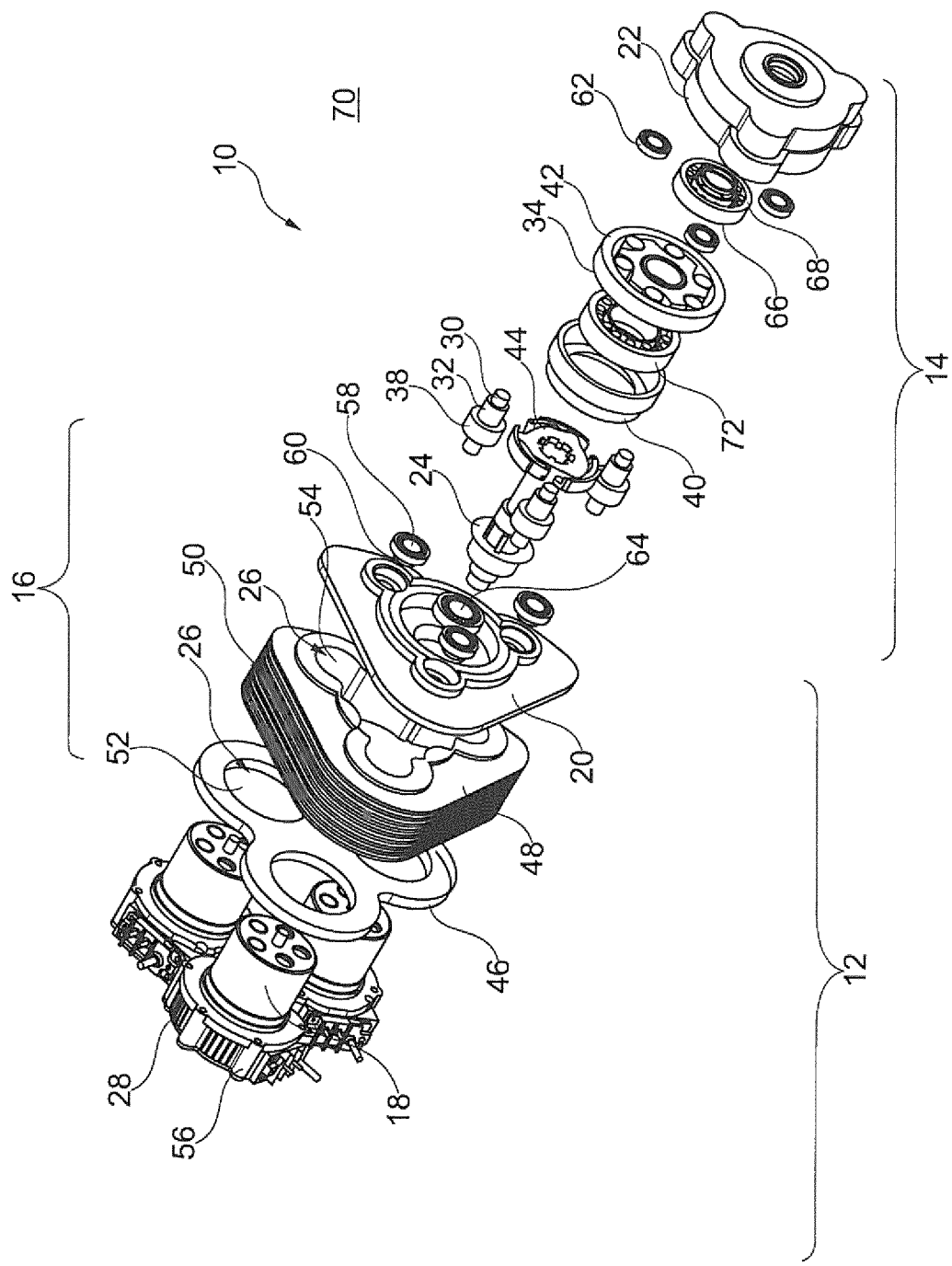
FIG. 4 is an exploded view of the construction of the drive unit.

In FIG. 4, the construction of the drive unit 10 is shown by way of an exploded representation. The drive unit 10 comprises a receiving unit 16, which is composed of a receiving flange 46, a housing wall 48 with cooling fins 50 and a motor part cover 20. The receiving unit 16 comprises a maximum number of receiving regions, of which one is exemplarily marked with the reference number 26. The receiving region 26 is composed of a circular opening 52 located in the receiving flange 46 and a recess 54 worked into the housing wall 48. Each of the receiving regions 26 is designed in order to receive one of the electrical machines 18.

According to the representation in FIG. 4, three structurally independently designed electrical machines 18 are to be inserted or are then inserted in the receiving unit 16. These electrical machines 18 are to be embodied identical in construction and is supposed to be, as far as the construction or the realization of the electrical drive unit 10 is concerned, virtually an electrical standard machine. The electrical machines 18 are fastened to the receiving flange 46 and thus connected to the receiving unit 16. For this purpose, fastening bores are provided on the electrical machines 18, of which one is exemplarily marked with the reference number 56. Through the fastening bores 56, screws, which for the sake of clarity are not shown in FIG. 4, can be inserted for example, which for the purpose of attaching the electrical machine 18 engage in associated threads located in the receiving flange 46.

Each of the electrical machines 18 comprises a machine output shaft for providing a machine torque, wherein one of these machine output shafts is exemplarily marked with the reference number 30. As already explained in connection with FIG. 3, the machine output shaft 30 comprises a gear wheel region 32 and a further gear wheel region 38. On the motor part cover 20, the machine output shafts 30 are mounted by way of roller bearings, of which one is exemplarily marked with the reference number 58. Between the respective roller bearing 58 and the motor part cover 20, sealing rings are arranged in order to seal the transmission-sided part 14 relative to the surroundings. One of these sealing rings is exemplarily marked with the reference number 60. On the transmission part cover 22, the machine output shafts 30 are also mounted by way of roller bearings, of which one is exemplarily marked with the reference number 62. With these roller bearings 62 it is also so that between the respective roller bearing 62 and the transmission part cover 22 sealing rings are arranged in order to seal the transmission-sided part 14 relative to the surroundings also at this location. Because of the selected representation, these sealing rings which are arranged on the transmission-sided part 14 however are not visible.

The main shaft 24 is likewise mounted by way of roller bearings, namely by way of a roller bearing 64 assigned to the machine-sided part 12 and by way of a roller bearing 66 assigned to the transmission-sided part 14. Between the roller bearing 64 and the motor part cover 20, a sealing ring, which, because of the selected perspective, is not visible, is arranged. Between the roller bearing 66 and the transmission part cover 22, a sealing ring 68 is arranged. The transmission-sided part 14 is thus completely sealed relative to the surroundings 70. This makes possible for example to cool the transmission-sided part 14 by means of oil. The machine-sided part 12, by contrast, as already explained above, is cooled by means of air.

The gear wheel regions 32 in each case interact with a coupling element 34, which is designed as gear wheel, and which because of the geometrical conditions can be described as sun gear. The coupling element 34 is operationally connected to the main shaft 24 via a freewheeling device 42. The further gear wheel regions 38 each interact with a further gear wheel 40, which is mounted on the main shaft 24 by means of a roller bearing 72. Furthermore, the further gear wheel 40 is operationally connected to the main shaft 24 via a clutch device 44, which is designed in order to make possible a frictional connection between the further gear wheel 40 and the main shaft 24.

Figure 5:
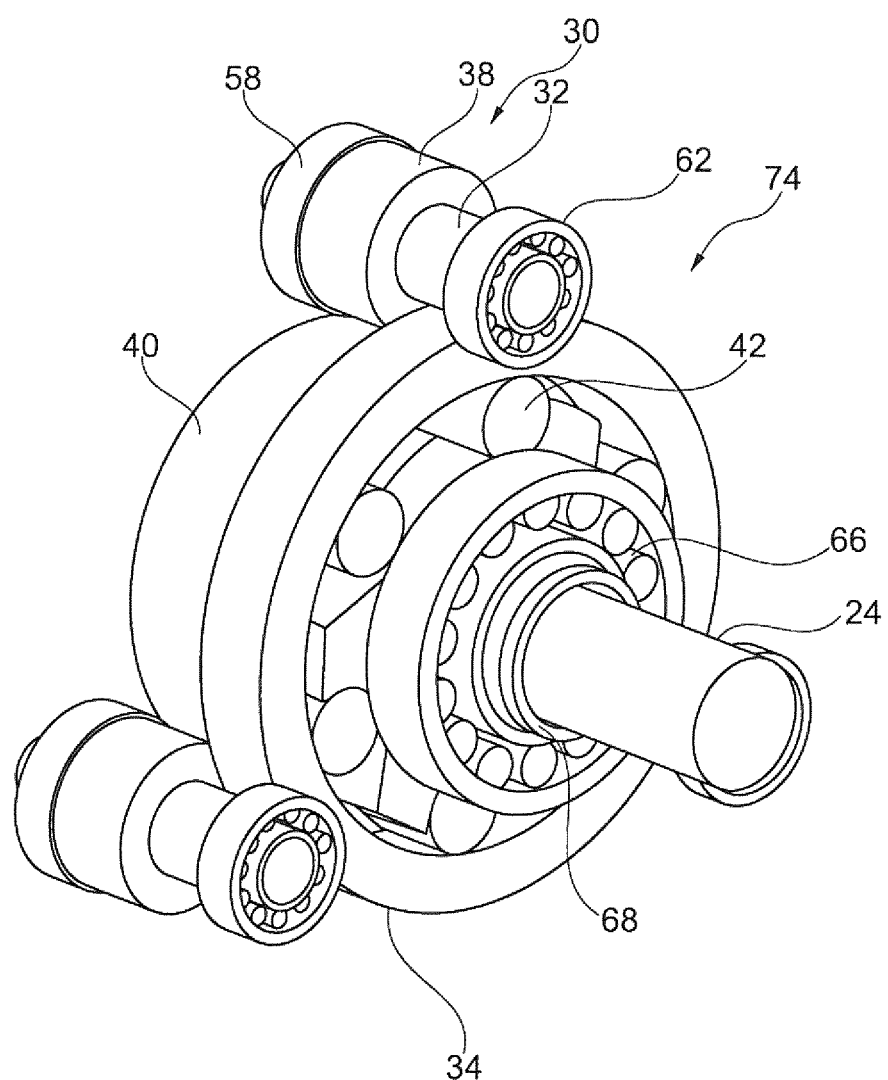
FIG. 5 is a schematic detail view of the part forming a first transmission stage of the transmission that is included in the drive unit.
Figure 6:
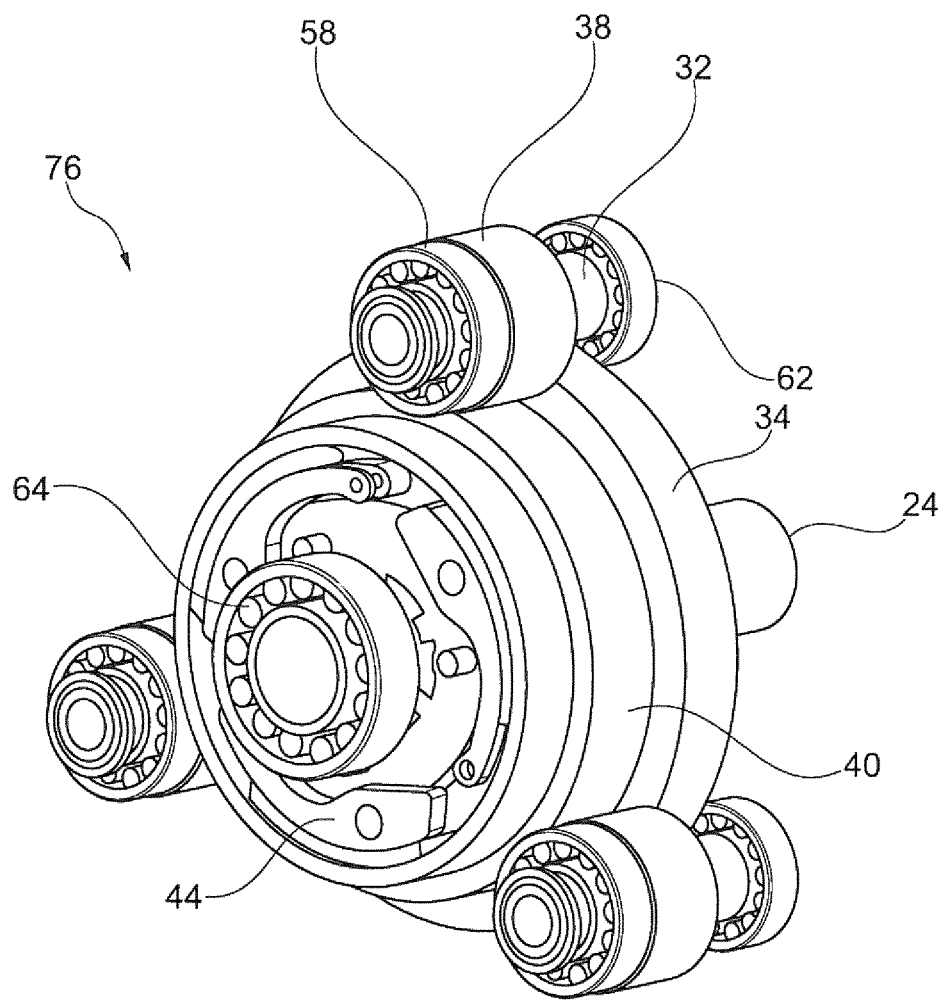
FIG. 6 is a schematic detail view the part forming a second transmission stage of the transmission contained in the drive unit.

At this point it should be noted that when exclusively roller bearings are shown in FIG. 4 this is not supposed to have any restrictive effect. Bearings which are designed otherwise can also be employed, for example ball bearings. In FIG. 5, that part of the transmission contained in the drive unit, which forms a first transmission stage 74 is shown, and in FIG. 6 that part of the transmission contained in the drive unit, which forms a second transmission stage 76, is shown. The first transmission stage 74 is formed in that gear wheel regions 32 interact with the coupling element 34 designed as gear wheel. The coupling element 34 interacts with the main shaft 24 via a freewheeling device 42. The second transmission stage 76 is formed in that further gear wheel regions 38 interact with a further gear wheel 40. The further gear wheel 40 is operationally connected to the main shaft 24 via a clutch device 44. Accordingly, the transmission described here is embodied in two stages. This is not supposed to have any restrictive effect. Obviously, the transmission can also be embodied in such a manner that it comprises more than two stages.

The foregoing disclosure has been set forth merely to illustrate the embodiments of the invention and is not intended to be limiting. Since modifications of the disclosed embodiments incorporating the spirit and substance of the embodiments of the invention may occur to persons skilled in the art, the invention should be construed to include everything within the scope of the appended claims and equivalents thereof.

What is claimed is:

1. An electrical drive unit for a vehicle, with a receiving unit, the receiving unit having a maximum number of receiving regions, of which each is designed in order to receive an electrical machine, the electrical drive unit comprising:
   a number of structurally independently designed electrical machines, wherein
      each of the electrical machines comprises a machine output shaft configured to provide a machine torque, and wherein each of the electrical machines is inserted in a receiving region assigned to it and is connected to the receiving unit, the receiving unit defining a first housing within which each of the electrical machines is housed,
      a common main shaft, via which the drive unit is configured to provide a drive unit torque on the output side, the common main shaft being housed within a second housing that is different from the first housing,
      a coupling element, via which the machine output shafts are operationally connected on the driving side to the main shaft to input the machine torques, and
      the inserted electrical machines are structurally independent and each comprise an individually assigned activation device, so that the drive unit is scalable, wherein
         the number of introduced electrical machines is predetermined based on a default value, the default value corresponding to an output-side characteristic quantity of the drive unit, and
         the number of electrical machines introduced is between 1 and the maximum number.

2. The electrical drive unit as claimed in claim 1, wherein the receiving unit is designed in such a manner that the inserted electrical machines are arranged in such a manner that the machine output shafts are oriented parallel to one another.

3. The electrical drive unit as claimed in claim 2, wherein the receiving unit is designed in such a manner that the inserted electrical machines are arranged in such a manner that the machine output shafts are arranged symmetrically with respect to the main shaft.

4. The electrical drive unit as claimed in claim 3, wherein the receiving unit is designed in such a manner that the inserted electrical machines are arranged in such a manner that the machine output shafts are oriented parallel to the main shaft.

5. The electrical drive unit as claimed in claim 4, wherein the coupling element is a gear wheel which is operationally connected to the main shaft.

6. The electrical drive unit as claimed in claim 5, wherein the coupling element is operationally connected to the main shaft via a freewheeling device.

7. The electrical drive unit as claimed in claim 6, wherein the machine output shafts comprise at least one gear wheel region, via which the at least one gear wheel region is operationally connected to the coupling element designed as gear wheel.

8. The electrical drive unit as claimed in claim 7, wherein the main shaft is part of a transmission of multi-stage design.

9. The electrical drive unit as claimed in claim 8, wherein for forming a first stage of the transmission, the at least one gear wheel region of the machine output shafts and the coupling element designed as gear wheel interact.

10. The electrical drive unit as claimed in claim 9, wherein for forming a further stage of the transmission, the machine output shafts each comprise a further gear wheel region, wherein the further gear wheel regions interact with a further gear wheel that is operationally connected to the main shaft.

11. The electrical drive unit as claimed in claim 8, wherein for forming a further stage of the transmission, the machine output shafts each comprise a further gear wheel region, wherein the further gear wheel regions interact with a further gear wheel that is operationally connected to the main shaft.

12. The electrical drive unit as claimed in claim 11, wherein the further gear wheel is operationally connected to the main shaft via a clutch device.

13. The electrical drive unit as claimed in claim 12, wherein the clutch device is designed to make a frictional connection between the further gear wheel and the main shaft.

14. The electrical drive unit as claimed in claim 13, wherein the receiving unit comprises cooling fins.

15. The electrical drive unit as claimed in claim 1, wherein the vehicle is a single-track vehicle.

* * * * *